(12) United States Patent
Nair

(10) Patent No.: US 11,165,726 B2
(45) Date of Patent: Nov. 2, 2021

(54) CONTEXTUAL SHARING FOR SCREEN SHARE

(71) Applicant: SAP SE, Walldorf (DE)

(72) Inventor: Arun Nair, Alappuzha (IN)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 16/661,638

(22) Filed: Oct. 23, 2019

(65) Prior Publication Data
US 2021/0126880 A1 Apr. 29, 2021

(51) Int. Cl.
*H04L 12/58* (2006.01)
*G06F 9/451* (2018.01)
*H04L 29/06* (2006.01)

(52) U.S. Cl.
CPC ............ *H04L 51/046* (2013.01); *G06F 9/451* (2018.02); *H04L 51/10* (2013.01); *H04L 63/10* (2013.01)

(58) Field of Classification Search
CPC ....... H04L 51/046; H04L 51/10; H04L 63/10; H04L 9/32; H04L 63/101; H04L 51/32; H04L 67/34; H04L 51/04; G06F 9/451; G06F 9/543; G06F 2201/84; G06F 9/44505; G06F 9/445; G06F 3/065; G06F 3/0481; G06F 3/1454; G06Q 10/06; G06Q 10/101; G06Q 10/103
See application file for complete search history.

(56) References Cited

U.S. PATENT DOCUMENTS

| | | | |
|---|---|---|---|
| 8,805,089 B2 | 8/2014 | Chang et al. | |
| 9,119,056 B2 | 8/2015 | Hourani et al. | |
| 9,355,375 B2 | 5/2016 | Knospe et al. | |
| 2012/0203854 A1* | 8/2012 | Chan | G06F 3/1454 709/206 |
| 2014/0331188 A1* | 11/2014 | Sandstrom | G06F 21/36 715/863 |
| 2015/0128017 A1* | 5/2015 | Fithian | G06F 40/134 715/205 |
| 2016/0283073 A1 | 9/2016 | Fu et al. | |
| 2017/0185244 A1* | 6/2017 | Hall | G06Q 10/103 |
| 2018/0083900 A1* | 3/2018 | Badr | H04L 12/4625 |
| 2018/0129657 A1* | 5/2018 | Guest | G06F 9/44 |
| 2018/0275835 A1* | 9/2018 | Prag | G06F 3/04845 |

* cited by examiner

*Primary Examiner* — Caroline H Jahnige
(74) *Attorney, Agent, or Firm* — Mintz Levin Cohn Ferris Glovsky and Popeo, P.C.

(57) ABSTRACT

In some embodiments, there is provided a system. The system may include at least one data processor and at least one memory storing instructions which, when executed by the at least one data processor, cause the apparatus to at least: in response to receiving a request to capture a screenshot at a first user equipment, identify, by a screen share service, one or more entities in a user interface being captured with the screenshot; store, by the screen share service in a persistent store, the identified one or more entities associated with the screenshot; in response to invoking the screenshot at a messaging application at a second user equipment, obtain, from the persistent store, the identified one or more entities to enable the second user equipment to present the identified one or more entities; and provide the identified one or more entities to the second user equipment.

19 Claims, 12 Drawing Sheets

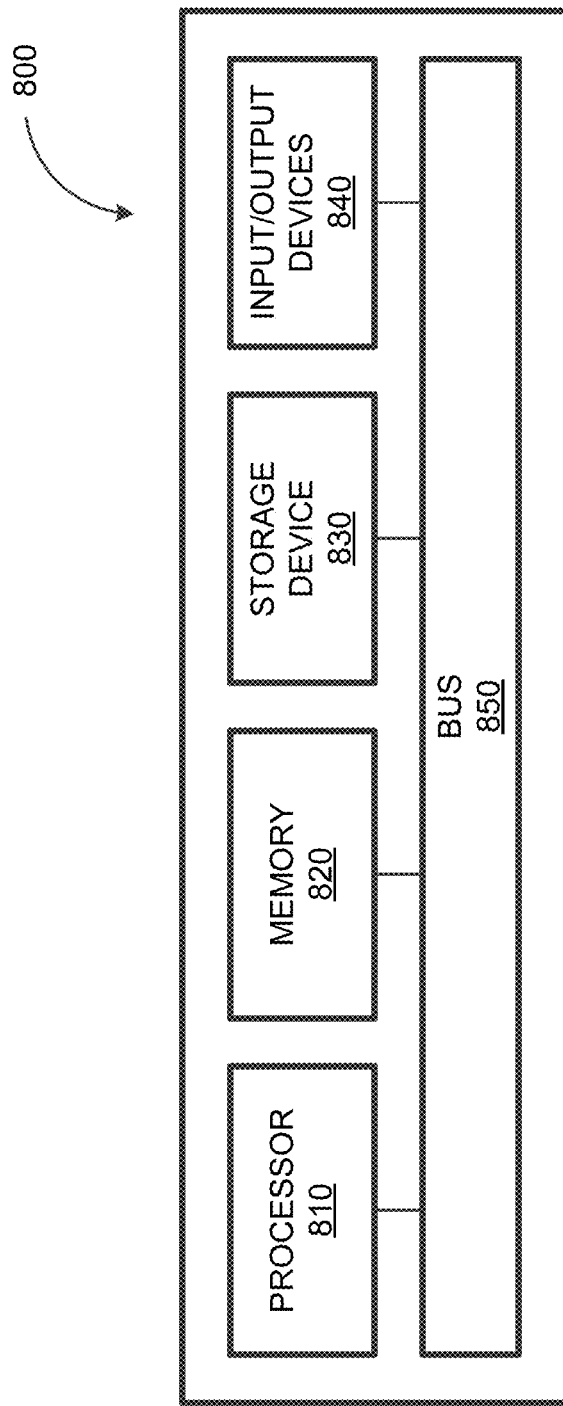

CONTEXTUAL SHARING FOR SCREEN SHARE

TECHNICAL FIELD

The subject matter described herein relates generally to smart screen sharing.

BACKGROUND

Collaboration between enterprise users and their associated devices has always been a desire, which has been addressed starting with phones, smart phones, and now chat messengers, screen shares, document shares, content sharing including "smart sharing" among group members. Digital assistants, such as SAP CoPilot and the like, may enable a user to create smart chats over applications. These digital assistants as well as other tools may provide a smart user experience—bridging the gap between predefined application functionality including processes and the users' personal way of working. The functionality may be enabled with natural language processing, screen share, chat, quick create, contextual analyzer, and the like.

SUMMARY

Systems, methods, and articles of manufacture, including computer program products, are provided for contextual screen sharing.

In some embodiments, there is provided a system. The system may include at least one data processor and at least one memory storing instructions which, when executed by the at least one data processor, cause the apparatus to at least: in response to receiving a request to capture a screenshot at a first user equipment, identify, by a screen share service, one or more entities in a user interface being captured with the screenshot; store, by the screen share service in a persistent store, the identified one or more entities associated with the screenshot; in response to invoking the screenshot at a messaging application at a second user equipment, obtain, from the persistent store, the identified one or more entities to enable the second user equipment to present the identified one or more entities; and provide the identified one or more entities to the second user equipment.

In some variations, one or more of the features disclosed herein including the following features can optionally be included in any feasible combination. The entity may include a data object and a method. The user interface may be presented at the first user equipment. And, a first messaging user interface may be presented within the user interface at the first user equipment to enable sending, via at least the messaging application, the screenshot to the second user equipment. The one or more entities in the user interface may be identified based on one or more bindings between the one or more entities and one or more user interface elements being presented at the user interface. The screenshot may be associated with the identified one or more entities and metadata to enable access to a target application for accessing the one or more entities. The metadata may include a uniform resource locator for navigating to the target application and parameters for accessing in the target application. The uniform resource locator may be stored, by the screen share service in the persistent store, in association with the identified one or more entities associated with the screenshot. The screenshot may be presented within a second messaging user interface associated with the messaging application at the second user equipment. The screenshot may be invoked by selecting the screenshot being presented on a display of the second user equipment. At the second user equipment, access may be enabled to the identified one or more entities based on an authorization service check to confirm the second user is authorized to view, use, and/or access the one or more entities. The providing of the identified one or more entities may be inhibited if the second user is not authorized.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning based plug-in for accessing a cloud-based analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8 depicts a block diagram illustrating a computing system, in accordance with some example embodiments.

When practical, similar reference numbers denote similar structures, features, or elements.

DETAILED DESCRIPTION

As noted, digital assistants, such as SAP CoPilot and the like, may enable a user to create smart chats over applications. In the case of screen share, a user at an associated user equipment (e.g., smart phone, computer, tablet, or other type of processor-based device) may take a screenshot showing a current state of an application. This screenshot may be shared with other user equipment (as well as their associated users). In some embodiments, there may be provided enhanced screenshot collaboration including the sharing of contextual information with other user equipment (as well as their associated users). This sharing may be performed across multiple systems, solutions, users and the like, while keeping the security aspects intact.

Figure 1A:
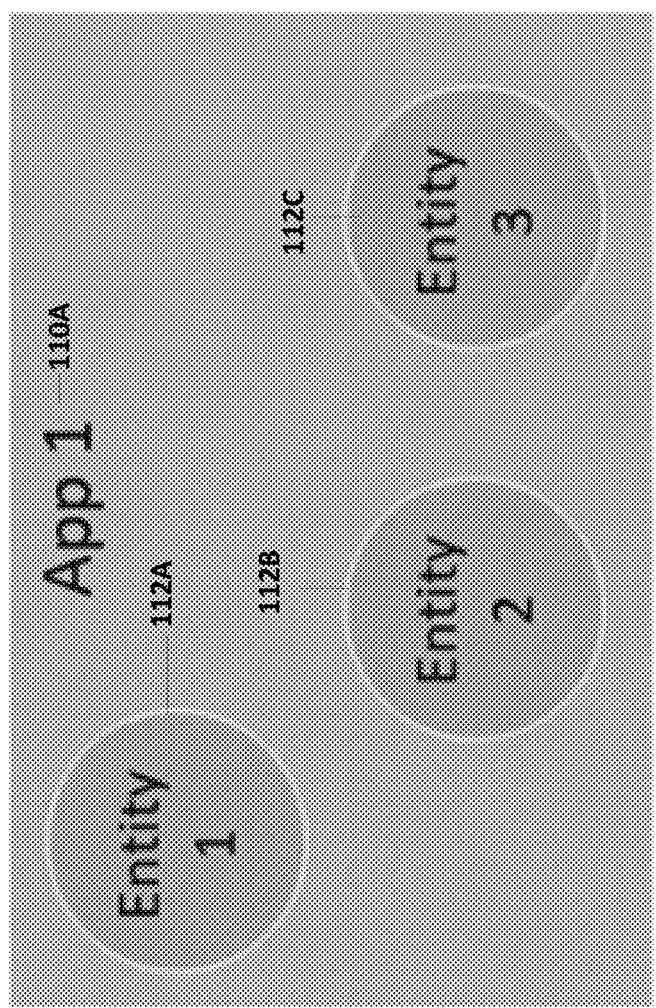
FIG. 1A depicts an application including a plurality of entities, in accordance with some example embodiments.
Figure 1B:
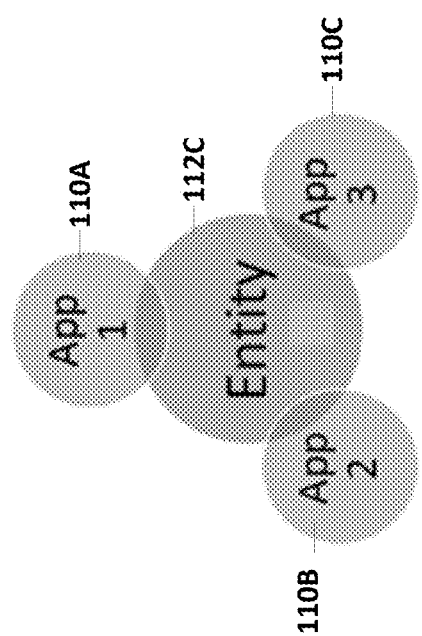
FIG. 1B depicts an entity accessed by different applications, in accordance with some example embodiments.

An application may be built upon multiple entities, such as data objects (or data structure), which may include data and an associated method such as an action. For example, an entity such as document ID may be linked to an actual document storage location. Moreover, an entity may be accessed by different applications based on whatever action (e.g., display, create, change, read, write, update, delete, and the like) that needs to be performed on the entity. Furthermore, access to the entity may be restricted based on the role of the application or the user in a given enterprise. For example, human resources data including private employee information may not be relevant to a user accessing a parts ordering application, so access to private employee information associated with entities and their corresponding applications may be restricted based on role or application type. FIG. 1A depicts a first application 110A including a plurality of entities 112A-C. The entity 112A may be accessed by one or more different applications 110A-C as well as shown at FIG. 1B.

To illustrate further, an entity may consist of master data or transactional data used in a process. The entity may include a key attribute, a non-key attribute, and a reference to other entities. The key attribute identifies the entity uniquely. The entities may be persisted in one or more database tables, and the entity may be accessed by processes to enable an action, such as a read, a change, a delete, and/or other actions, using certain operations or methods. In an enterprise software system, access to entities may be provisioned by specific applications, which consume the operations that are provided by the entity. By way of an example, an entity may be a financial document posted against a project on a certain date. In this example, the financial document is an entity whose key attribute is document ID and a non-key attribute is date and project (which is another entity in its own right). Here, the financial document is a transactional data entity, while the project is a master data entity. By way of another example, a sales order item is created for a material for a certain quantity. In this example, the sales order item is an entity whose key attribute is a sales order item ID and the non-key attributes are quantity and material (which is another entity). Here, the sales order item is a transactional data entity, while the material is a master data entity.

Figure 1C:
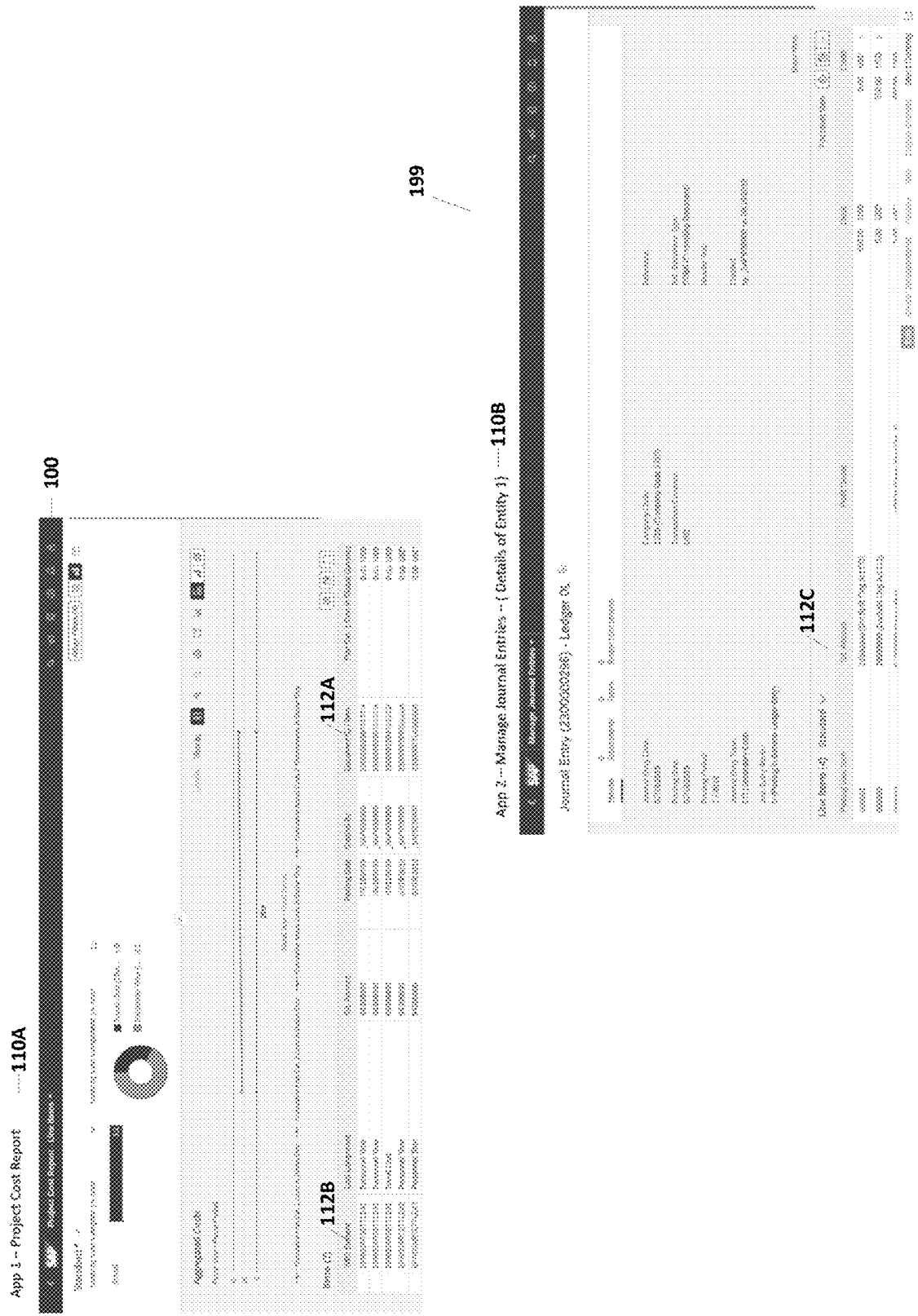
FIG. 1C depicts examples of user interfaces including applications and associated entities, in accordance with some example embodiments.

FIG. 1C depicts a user interface 100 for an application 110A including entity 112A (which in this example is document ID) and entity 112B (which in this example is work breakdown structure element). The user interface 100 may be presented on a display of the first user equipment, such as a tablet, a smart phone, a computer, and/or other types of processor-based device (which may be executing the application 110A). In the example of FIG. 1C, the application 110A may thus be accessed by a first user associated with a first user equipment.

FIG. 1C also depicts a user interface 199 for an application 110B including an entity 112C (which in this example is G/L account). Application 110B may be used to display the details of entity 112A (which in this example is accounting document). In the user interface 199 example, the application 110B may be accessed by a second user associated with a second user equipment (which may be executing the application 110B). The user interface 199 may be presented on a display of the second user equipment, such as a tablet, a smart phone, a computer, and/or other type of processor-based device.

In the example of FIG. 1C, the first user may want to share a screenshot of application 110A with the second user to allow the second user to act on entity 112A. When the first user wants to share the user interface 100 with the second user, the first user may trigger a screenshot of the user interface 100. This screenshot of user interface 100 may be shared via a message, such as a text, a chat, an email, or other type of message type, with the second user.

Figure 2A:
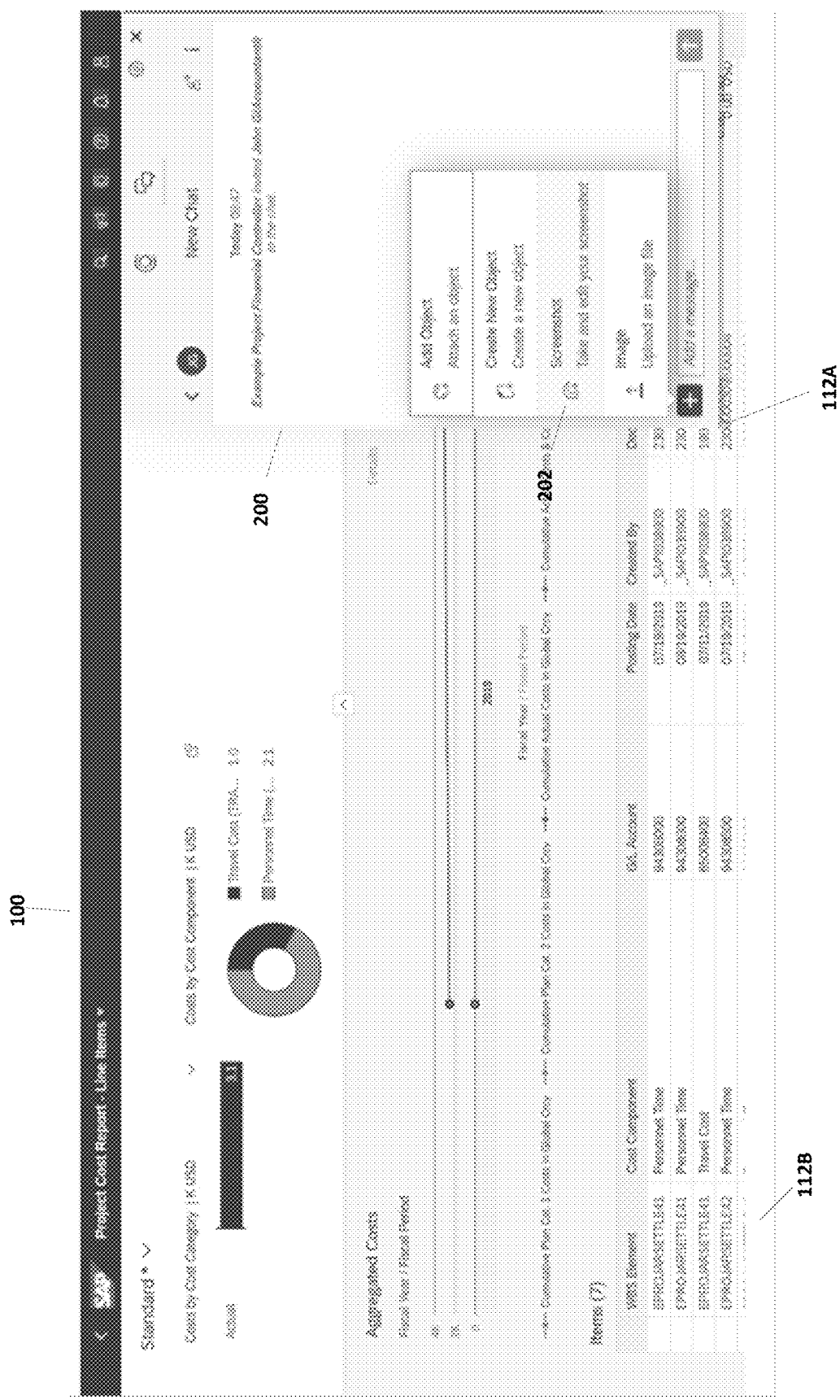
FIGS. 2A, 2B, and 2C depict an example of sharing a screenshot, in accordance with some example embodiments.
Figure 2B:
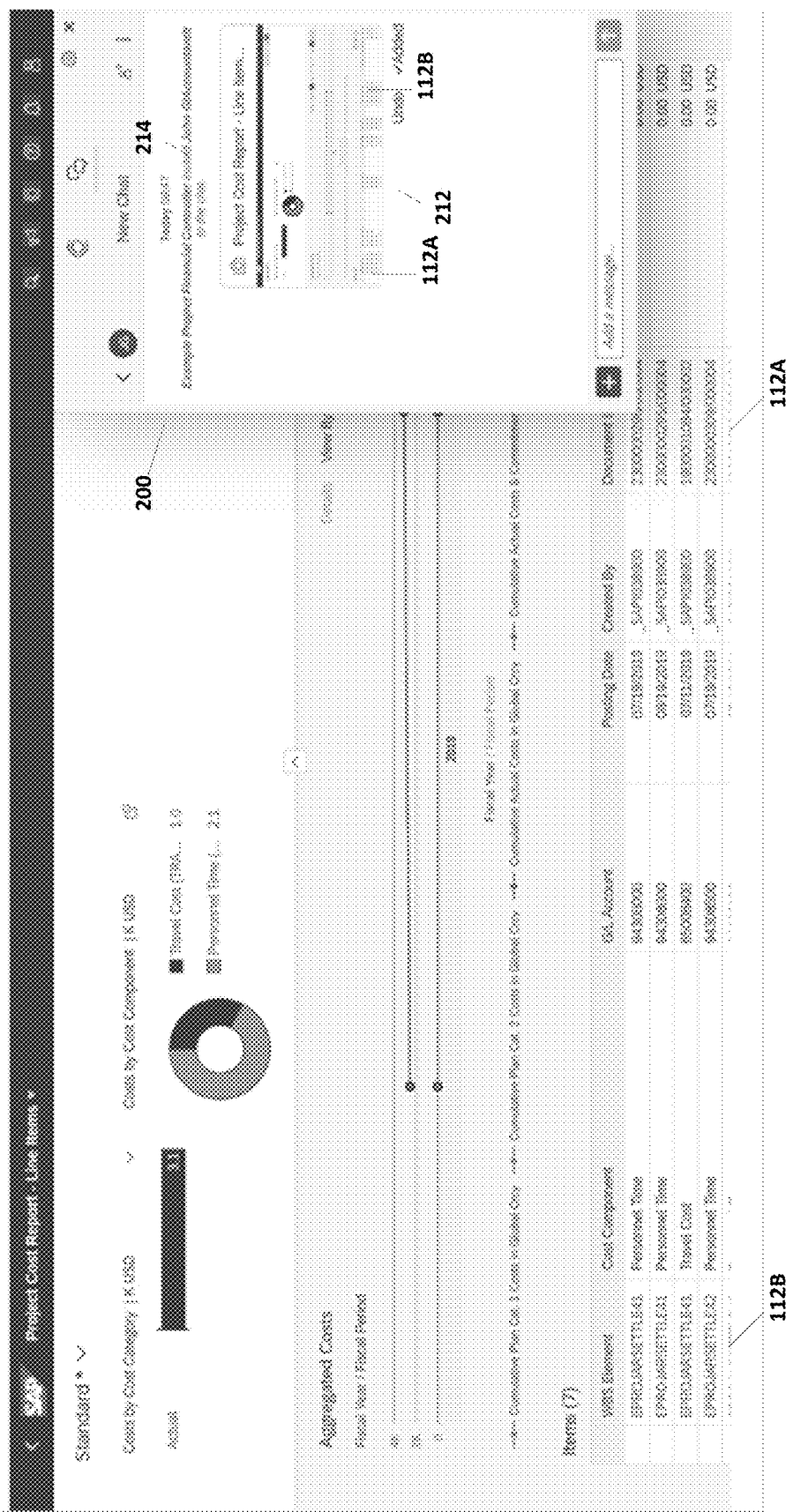

FIG. 2A depicts an example of the first user sharing the screenshot with a second user via a messaging user interface 200. The messaging user interface may enable messaging such as text, chats, etc. between users. In the messaging user interface 200, a user interface element 202 allows a selection of a screenshot request (e.g., "Screenshot take and edit your screenshot). When the user interface element 202 is selected, the user equipment presenting (e.g., via a display) user interface 100 triggers a screenshot (e.g., screen capture or copy of the user interface 100), and then inserts the screenshot 212 of user interface 100 in a message as shown in FIG. 2B at 212. This message including the screenshot 212 is then sent to the second user via a message, such as a chat or text message, for example. The messaging user interface 200 may be presented within the user interface 100 to facilitate the sending of the screenshot, although messaging user interface may be presented at other locations on a display as well.

Figure 2C:
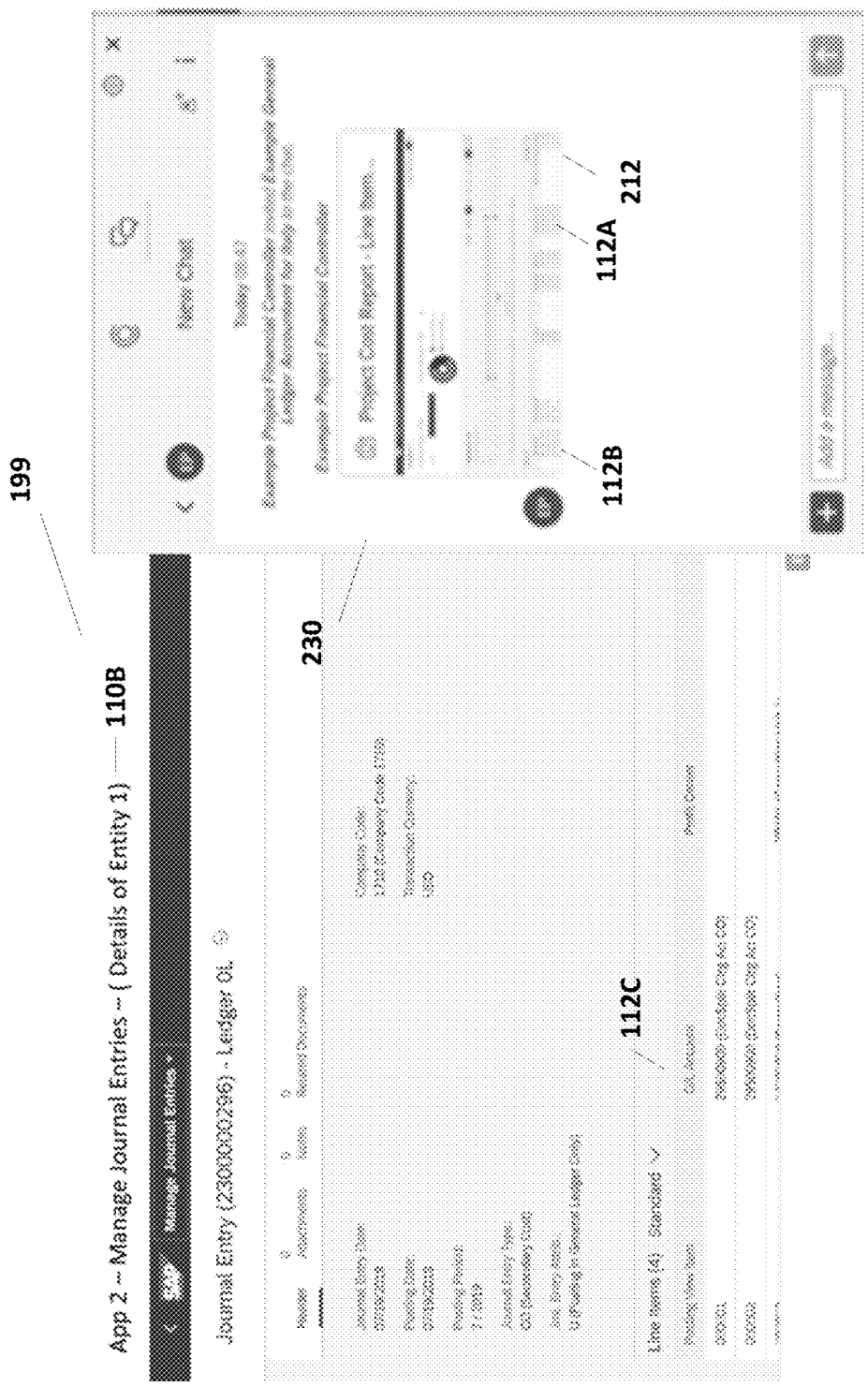

FIG. 2C shows the second user's messaging user interface 230 including the screen captured user interface 212 (which is a screenshot of user interface 100 that was sent at FIG. 2B by the first user). As shown, the messaging user interface 230 may be presented on a display along with the second application 110B being accessed by the second user. As noted however, the second user accessing the second application 110B does not have access to the same application as the first user accessing the first application 110A. For example, when the second user opens the screenshot 212 and selects the entity 112A (which in this example is document ID) in the screenshot 212, the second user may not be able to access the first application 110A, but will be able to access it via application 110B. The messaging user interface 230 may be presented within the user interface 199 to facilitate the sending of the screenshot, although messaging user interface may be presented at other locations on a display as well.

In some embodiments, a screen share service may be provided to identify and store the corresponding entities (e.g., the entity 112A) before the message is sent to the second user, so that when the second user opens the screenshot 212 and selects the entity 112A in the screenshot 212 for example, the second user can access the entity 112A-112B, which are both stored in a persistent store by the screen share service.

The screen share service may, in some embodiments, store contextual information including metadata to enable access to the first application 110A by the second user at the second user equipment. The contextual data and metadata (which is stored) may enable navigating to a target application, such as an application that is able to open an entity for viewing, editing, manipulation, etc.

Figure 3:
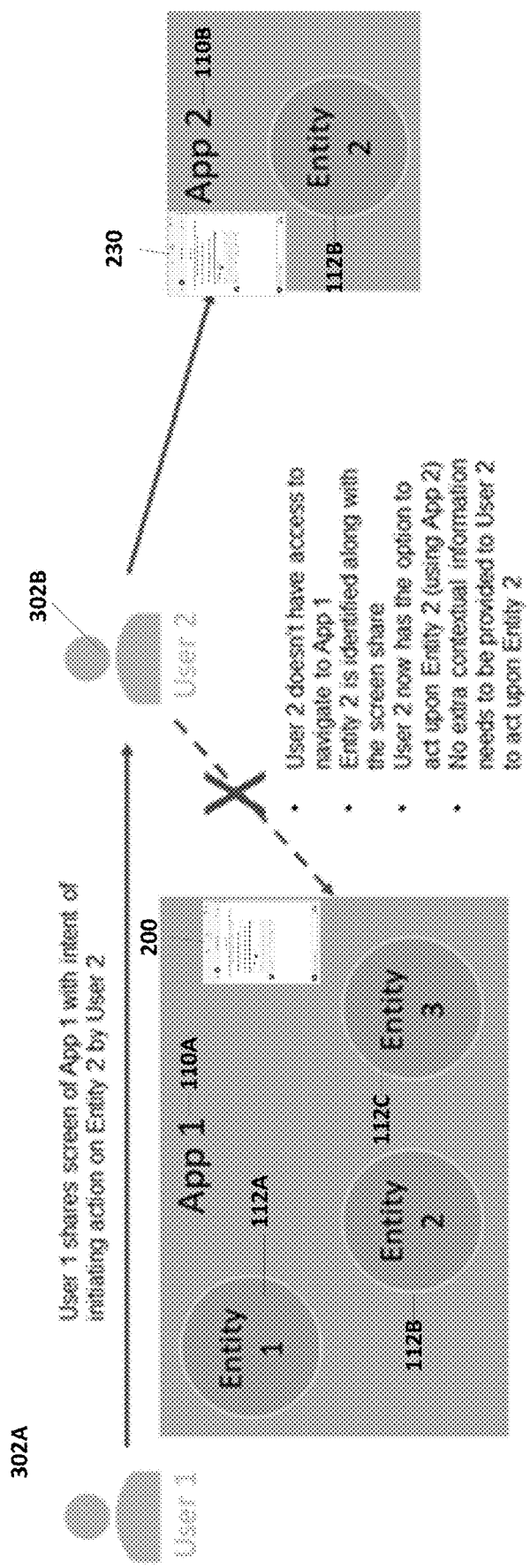
FIG. 3 depicts an example of a process for sharing a screenshot via messaging between a first user accessing a first application and a second user accessing a second application, in accordance with some example embodiments.

FIG. 3 depicts an example of a process for sharing a screenshot via messaging 200 and 230 between a first user 302A accessing application 110A and the second user 302B accessing the second application 110B. As noted, the second user at the second application 110B does not have access to the first application 110A, so when the second user selects the screenshot 212, the second user will not be able access to the first application 110A and the entity 112A, for example. However, the screen share service may identify and store the first application 110A (or, e.g., its URL) and/or the entity 112A, so that when the second user opens the screenshot 212 contained in the messaging user interface 230 and selects the entity 112A in the screenshot 212, the second user can access the second application 110B and the entity 112A.

Referring again to FIG. 2A, when a first user triggers a screenshot for the user interface 100, the screen share service may trigger extraction of the entities being accessed by the first application 110A. For example, the screen share service may extract entities and/or metadata from the browser (e.g., user interface 100), front-end server, and backend server. The extracted metadata may enable access to the second application 110B (e.g., metadata that constructs URL to the second application, and/or the like). Next, a persistence service may store the extracted entities and metadata at a persistent store, such as a database or the like. For example, the persistence store may store a plurality of entities and, in particular, entity 112A, 112B, and so forth. When the screenshot of user interface 100 is sent from the first user to the second user as shown in FIG. 2C for example, the second user may access the screen share service to obtain and/or view the entities, such as entity 112A, that were previously stored by the screen share service and, in particular, the persistence service. In this way, the second user at the second application 110B may not need the first application 110A to be resident on the second user's user equipment in order to view and access for example the first entity 112A.

In the previous example, in case the second user had access to the first application 110A, the screen share service and its persistent store may be by passed in favor of the first application's direct access to the first entity.

Figure 4:
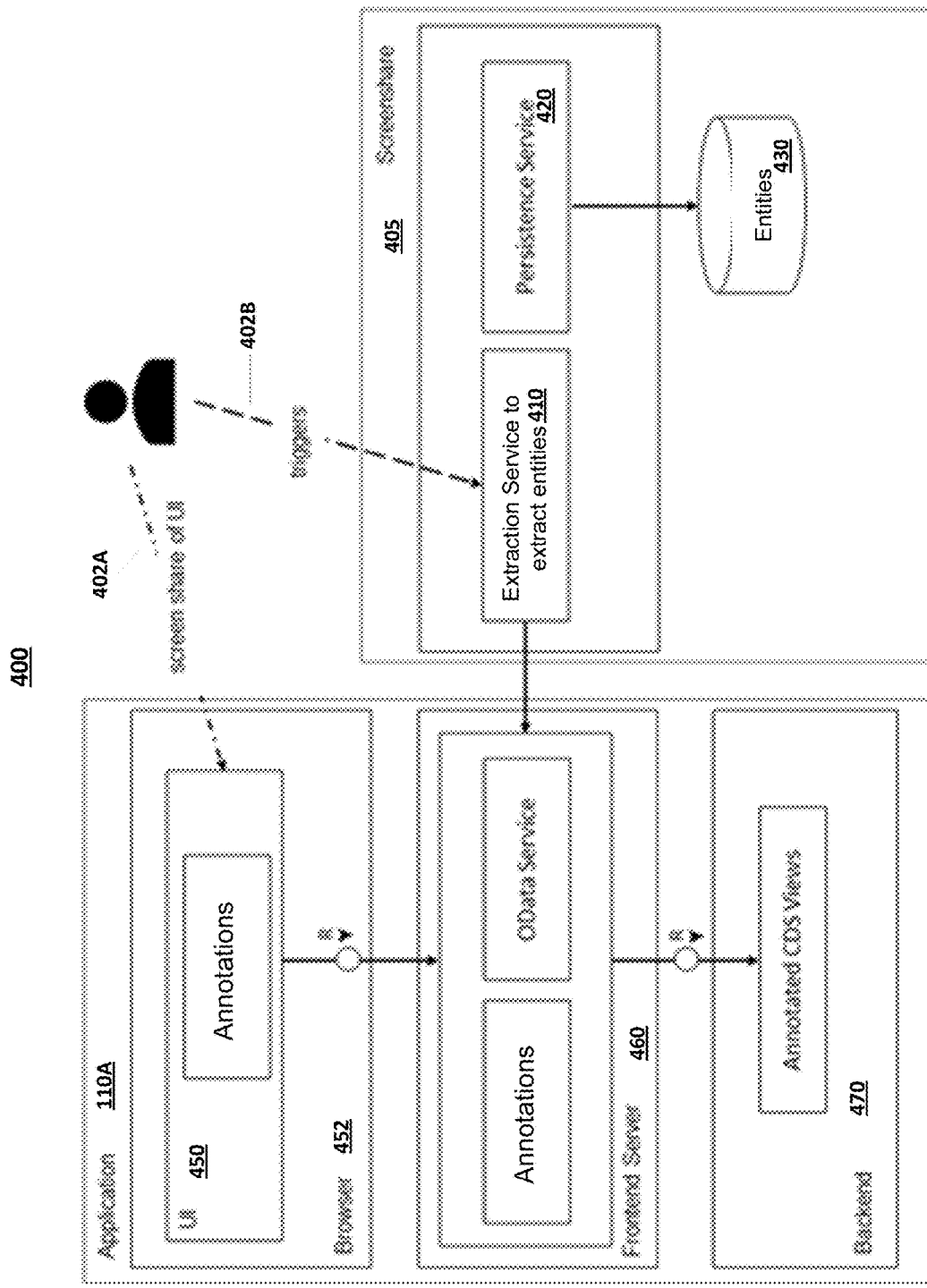
FIG. 4 depicts an example of a system including a screen share service, in accordance with some embodiments.

FIG. 4 depicts an example of a system 400 including a screen share service 405, in accordance with some embodiments. When a screenshot request 402A is made to capture at least a portion of user interface being presented on a display, the screen share service triggers 402B identifying and storing the entities associated with an application, such as application 110A, being presented via the displayed user interface (and captured via the screen capture). In some embodiments, the screen share service is provided as a cloud or web-based service accessible by the first and second user's devices.

Referring to the FIG. 2B example, the entities being presented include 112A, 112B, and so forth. From a given screenshot 212 of the user interface 100, the screen share service 405 may identify the entities 112A and 112B associated with the first application 110A. In some embodiments, an extraction service 410 may be used to extract the identified entities. Moreover, the screen share service may include a persistent service 420 to store at a persistent store 430 the identified entities.

As noted, the extraction service 410 may extract the displayed entities, such as entities 112A, 112B, and so forth. The extraction service may also extract metadata about the entities and/or metadata about the application (e.g., a location where the first application can be accessed, configuration information for the first application and/or the like, key attributes of the entity that can be used to identify the entity uniquely, and additional data which will help construct the URL to access the application(s) which operate on the entity). The persistence service 420 may, as noted, store at the persistent store 430 the entities extracted by the extraction service 410 and/or the metadata.

Referring again to the example of FIG. 1C, the user interface 100 for the first application 110A includes a plurality of entities, such as 112A and 112B. In this example, the extraction service may identify the entities 112A and 112B based on the bindings between the user interface elements (which are being presented at user interface 100) and the entities. To discover these entities from an application being displayed via the user interface, a user interface component may use these bindings. In the case of the OData protocol, entities including metadata and annotations may be derived from the UI component's managed objects. These derived entities may then be identified and then stored along with the screen share instance 212. In some implementations, the extraction service 410 may operate primarily on OData annotations when identifying and extracting entities. The OData annotations may include entity data (e.g., data associated with the entity), the actions that can be performed on the entity, and/or parameters required to access in the application (such as application 110A).

Figure 5:
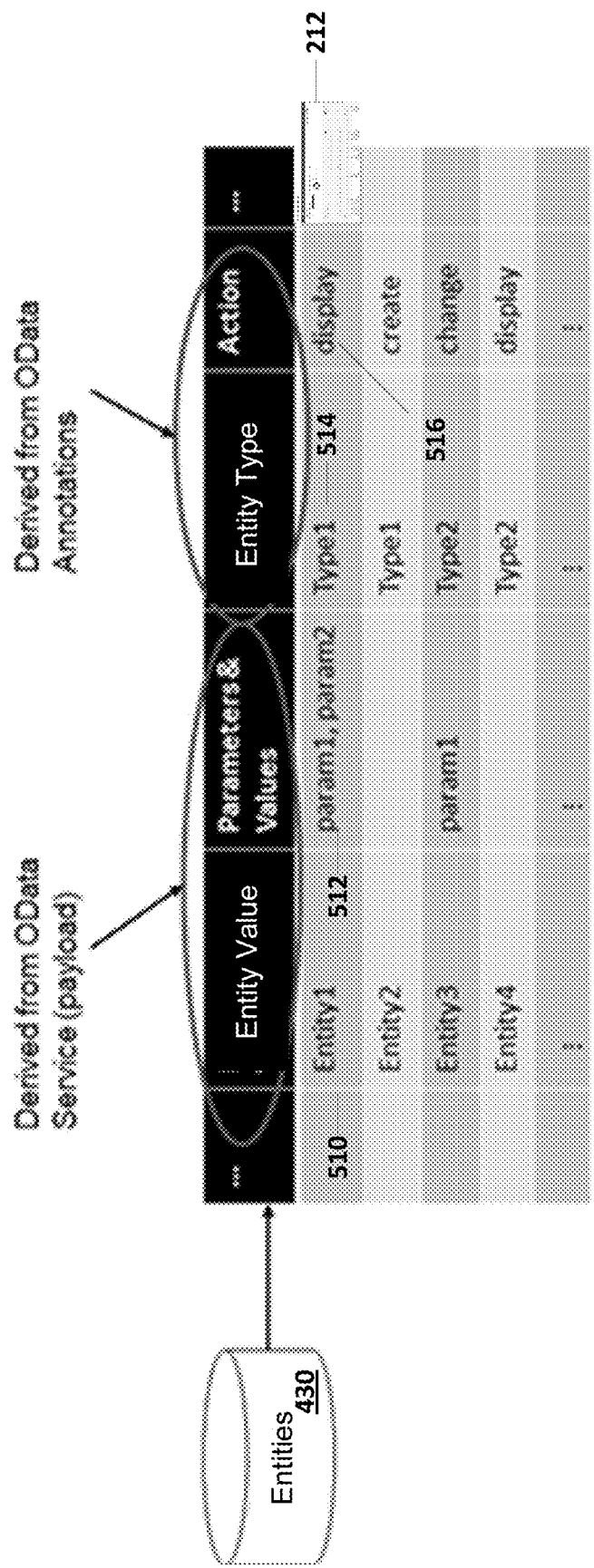
FIG. 5 depicts an example of an entity being stored at a persistent store along with parameter values, an entity type, and an action, in accordance with some embodiments.

FIG. 5 depicts an example of an entity 510 being stored at the persistent store 430 along with parameter values 512 (which may be needed to access the application such as URL, credentials, etc.), an entity type 514, and the action 516 associated with the entity. For this entity 510, the corresponding screenshot instance 212 may be stored as well (or a link to that instance 212). Regarding annotations, annotations may be in core data service views to enrich the definition with metadata. This metadata may be used by different services (including user interface components) to do various functions such as checking access control, controlling a user interface element, enabling cross application navigation, and the like. There are different types of annotations that can be used to define the metadata. For example, access control annotations represent an authorization check for an entity being executed. Consumption annotations define a specific behavior that relates to the consumption of core data service content through domain-specific frameworks. The user interface annotations represent semantic views on business data with specific patterns that are independent of the underlying UI technology. These annotations may be carried over from the CDS views to the OData service to the UI rendering.

In the above sample, the annotations added to attribute Accounting Document may be used in the following ways. The extraction service 410 (FIG. 4) reads the semantic object and semantic object action along with the data, so that semantic object, action, and data can be stored in the database 430 using the persistence service 420. The underlying UI technology (e.g., SAP Fiori or other UI technology) may have intent-based navigation, whereby an intent is a combination of <semanticObject><action>. The semanticObject annotation is used by the UI to dynamically derive navigation targets for the annotated view as a source. This is how user 302B at FIG. 6 may navigate to the application 110B at FIG. 3. The UI understands that entity Accounting Document needs to be displayed as a line item with the label Accounting Document.

When the screen shot is taken by the first user at FIGS. 2A-2B, the persistence may store the data shown in Table 1. The data that is stored depicts the entity 112A in FIGS. 2A-2B. When the second user at FIG. 2C invokes the screen shot 212, the navigation target to the second application 110B may be constructed using the entity value, parameters and values, and action as shown at Table 1. For example, the navigation target constructed may be as follows: https://<system url>/ui#AccountingDocument-displayFactSheet?AccountingDocument=2300020232&CompanyCode=1010&FiscalYear=2019. This is the navigation target that will launch the second application 110B (FIG. 2C). Since the second user is authorized to view and/or access the second application in this example, the second user is able to view the data.

screen share instance 212 and entities, as noted at FIG. 5, for example. When the second user 302B at FIG. 6 invokes a screenshot instance such as screenshot 212 (e.g., by selecting the screenshot 212 within the messaging interface 230), the entities 112A and 112B stored in the persistence store may be loaded along with the screen share instance 212, as well as other contextual information including metadata (e.g., parameter values 512, entity type 514, and action 516). Contextual data refers to the data of the entities that are present in first application 110A that the first user 302A intends to share with second user 302B.

The authorization service 612 may perform a check to ensure that only the entities that the second user is authorized to access are accessed or loaded. In some implementations, the authorization service 612 may filter the entities the second user is not supposed to access. For example, the first application 110A related to the entity 112A may first be identified and then a check may be performed to see if the second user has access rights to the first application 112A.

Regarding the authorization service, once the entities are determined by the identity service 610 (see, e.g., FIG. 6), the information is passed to authorization service. The authorization service may construct the navigation URL in the following manner: https://{host}:{port}/<entity value>-<action>?<Parameters & Values>. Referring to the previous example, the navigation URL may take the following form: https://{host}:{port}/AccountingDocument-diplayFactSheet?AccountingDocument=2300020236&CompanyCode=1010&FiscalYear=2019. The URL may at some point be upload to application 110B. The authorization service may check whether the second user 302B has access to this application 110B. If so, the second user may view details of entity 112A in application 110B. If

TABLE 1

| Entity Value | Parameters & Values | Entity Type | Action | |
|---|---|---|---|---|
| ... AccountingDocument | AccountingDocument = 2300020232&CompanyCode = 1010&FiscalYear = 2019 | Accounting Document | displayFactSheet | ... |
| ... ... | ... | ... | ... | ... |
| ... ... | ... | ... | ... | ... |

Figure 6:
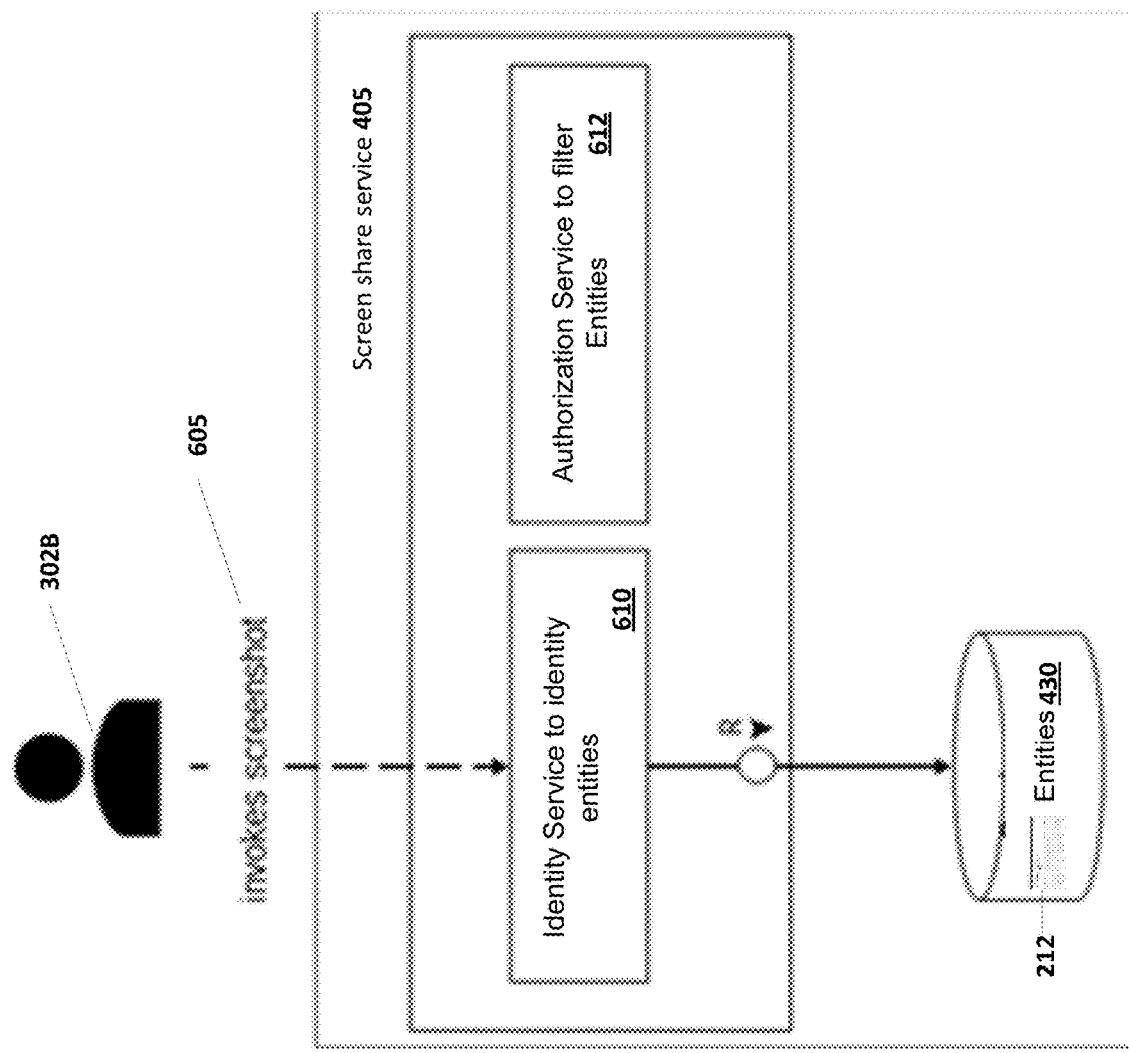
FIG. 6 depicts an example of invoking the screen share service, in accordance with some embodiments.

FIG. 6 depicts the screen share service 405 further including an identity service 610 to identify entities and an authorization service 612. Regarding the identity service 610, the data that is stored (at persistent store 430) against an entity may be used to identify the entity uniquely. This means that storing not only the key(s) of the entity but also the entity type, role in the enterprise, and/or other parameters may be used to identify the entity uniquely. There may be instances where there is more than one entity that the identity service identifies for a screenshot and the authorization service allows the user 302B to access more than one entity for a screenshot. When this is the case, the second user 302B may need to choose the application that is intended to be navigated to.

The authorization service 612 may, in some implementations, provide authority checks to make sure that only specified users of a collection (e.g., one or more entities) may execute certain operations on the collection. The authorization service 612 may, in some implementations, provide authority checks to make sure that only specified users may be allowed to retrieve the collection. The screen share instance 212 may be stored by the screen share service at 430 along with the entities and other contextual data for the not, the second user may only get to view the screenshot and will not be able to navigate to application 110B.

In some implementations, the screen share service 405 may be configured to identify a target user, such as the second user receiving the message 230 including the screen share instance 212 as shown at FIG. 2C. This identification may include identifying credentials (e.g., access rights for the entity 112A and 112B as well as for application 110A) for the second user. For example, the role of a second user within an enterprise may map to a policy that defines which entities and/or applications the second user may access. As noted, if the second user is in human resources, the second user access might be very different from a user in accounts payable or shipping.

Figure 7:
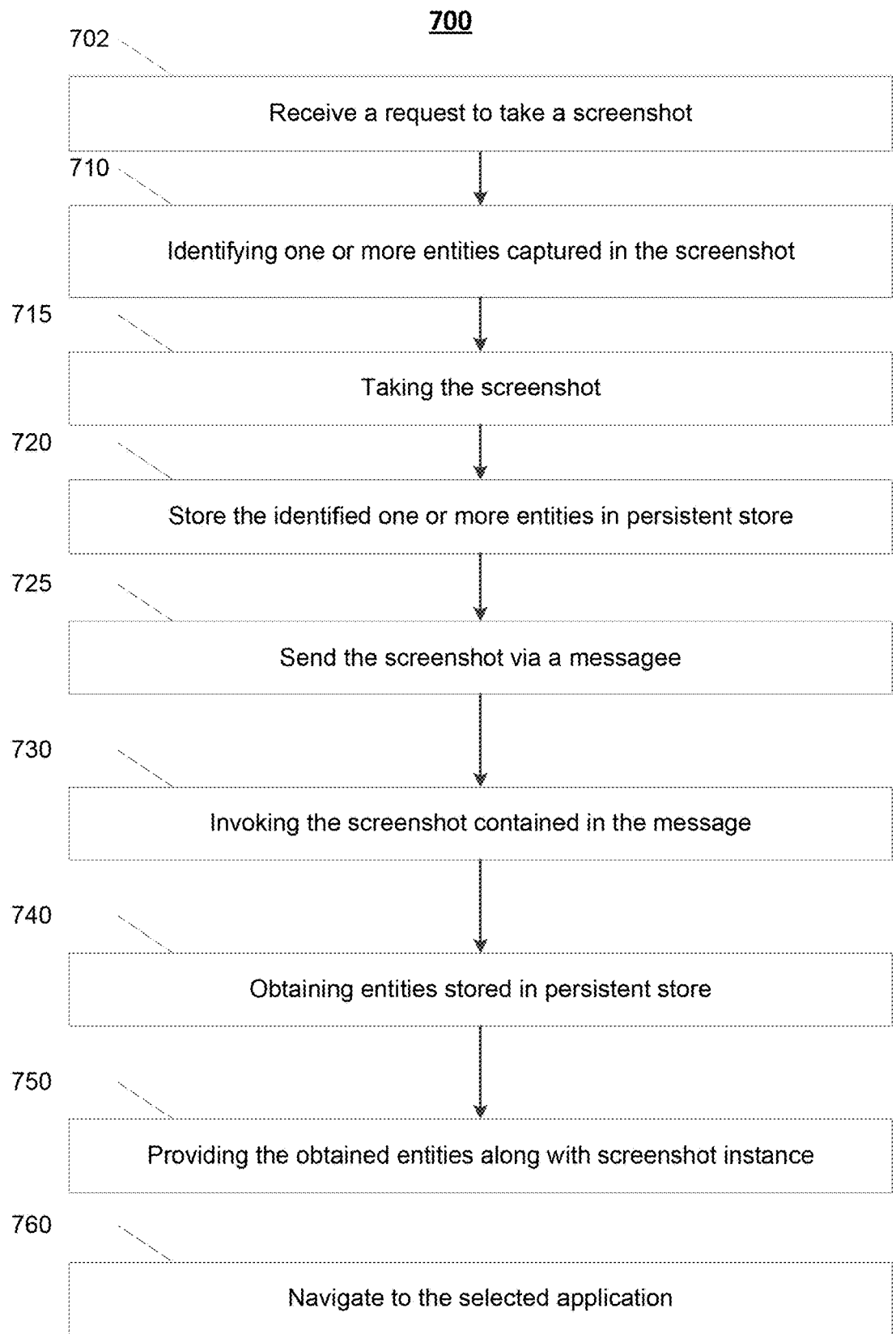
FIG. 7 depicts an example of a process for sharing screens, in accordance with some embodiments.

FIG. 7 depicts an example of a process for smart sharing, in accordance with some example embodiments.

At 702, a request to take a screenshot of a user interface including one or more entities is received. Referring to FIG. 2A, a selection 202 for the screenshot is made at the messaging user interface 200. This selection may be a request to the user equipment to take a screenshot of the user interface 100 (or a portion of the user interface). In the example of FIG. 2A, the user interface is for application 110A, which includes one or more entities 112A, 112B, and so forth.

In response to the received request, the screen share service identifies, at 710, one or more entities in user interface being captured with the screenshot. For example, the screen share service 405 may identify the entities 112A-B in the user interface 100 being captured at FIG. 2A. As noted, the application 110A and/or the user interface 100 may include a user interface (UI) component configured to identify the entities 112A-B by accessing or reading the binding between the UI elements displayed on the screen and the entities 112A-B.

In response to the received request, the user equipment may also take a screenshot, at 715, and associate the screenshot instance with the identified entities and other contextual data. For example, the first user's user equipment may take a screenshot of user interface 100 and insert it into a smart chat messaging application 200 as shown at 212 at FIG. 2B. The screen share service 405 may associate the screenshot instance 212 with the identified entities 112A-B, the first application 110A, and other contextual information including metadata, examples of which include metadata from the browser (e.g., user interface 100), the front-end server, and the backend server. As noted, the metadata may enable access to the first application 110A (e.g., a location, or URL for the first application, and/or the like). The contextual data may also include entity data (e.g., data associated with the entity), the actions that can be performed on the entity, and/or parameters required to access in an application 110A-B, for example.

At 720, the screen share service may store the identified entities in persistent store. For example, the screen share service 405 may store the screenshot instance 212 with the identified entities and other contextual data in persistent store 430, although the screenshot instance may be stored in another location and linked to persistent store 430. In the example of FIG. 5, the persistent store 405 stores the entity 510 (e.g., entity 112A), parameter values 512 for that entity, the entity type 514, the action 516 that can be performed on the entity, and the screenshot instance 212.

At 725, the first user may send the screenshot to a second user. In the example of FIG. 2B-2C, the first user at a first user equipment sends via the chat messaging application 200 the screenshot instance 212 to the second user at a second user equipment.

At 730, the second user may invoke the screenshot. For example, the second user at FIG. 2C may invoke the screenshot instance 212 by selecting to view one of the entities such as entity 112A. For example, the second user may select on a display presenting the screenshot instance 212 the entity 112A to view that data. When that is the case, the screen share service may obtain, at 740, the entities associated with the screenshot as well as other data contained in persistent store 430.

At 750, the accessed entities may be provided to the second user. For example, the screen share service 405 may provide the accessed entities such as entity 112A to second user's user equipment where the entity may be displayed, processed, and/or the like. In some implementations, the authorization service 612 may, as noted, check to make sure the second user is authorized to view, use, and/or access the entities such as entity 112A. If so, the second user can view the entity 112A, for example. If not, the second user cannot view the entity 112A, for example.

At 760, the target application, such as application 110A, in this example, may be navigated to enable the second user to access the entity 112A and thus view it on the second user device.

FIG. 8 depicts a block diagram illustrating a computing system 800 consistent with implementations of the current subject matter. The computing system 800 can be used to implement the user equipment or one or more of the components therein such as the screen share service 405, a screenshot engine configured to take screenshots of the display of the user equipment, and/or other components disclosed herein. As shown in FIG. 8, the computing system 800 can include a processor 810, a memory 820, a storage device 830, and input/output device 840. The processor 810, the memory 820, the storage device 830, and the input/output device 840 can be interconnected via a system bus 850. The processor 810 is capable of processing instructions for execution within the computing system 800. Such executed instructions can implement one or more components of, for example, the screen share service 405. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, a tape device, a solid-state device, and/or any other suitable persistent storage mechanisms. The input/output device 840 provides input/output operations for the computing system 800. In some example embodiments, the input/output device 840 includes a keyboard and/or pointing device. In various implementations, the input/output device 840 includes a display unit for displaying graphical user interfaces. According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet, the cellular network, and/or the like).

In some example embodiments, the computing system 800 can be used to execute various interactive computer software applications that can be used for organization, analysis, and/or storage of data in various formats. Alternatively, the computing system 800 can be used to execute any type of software applications. These applications can be used to perform various functionalities, such as planning functionalities (e.g., generating, managing, editing of spreadsheet documents, word processing documents, and/or any other objects, etc.), computing functionalities, communications functionalities, etc. The applications can include various add-in functionalities (e.g., SAP Co-Pilot, SAP Integrated Business Planning as an add-in for a spreadsheet and/or other type of program) or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      in response to receiving a request to capture a screenshot at a first user equipment, identifying, by a screen share service, one or more entities in a user interface being captured with the screenshot;
      storing, by the screen share service in a persistent store, the identified one or more entities associated with the screenshot;
      in response to invoking the screenshot at a messaging application at a second user equipment and the second user equipment not having access to a target application providing access to the one or more entities, obtaining, from the persistent store, the identified one or more entities to enable the second user equipment to present the identified one or more entities;
      providing the identified one or more entities to the second user equipment; and
      in response to invoking the screenshot at the messaging application at the second user equipment and the second user equipment having access to the target application providing access to the one or more entities, by-passing the persistent store to enable direct access of the one or more entities by the second user equipment.

2. The system of claim 1, wherein the entity comprises a data object and a method.

3. The system of claim 1 further comprising:
presenting the user interface at the first user equipment; and
presenting a first messaging user interface within the user interface at the first user equipment to enable sending, via at least the messaging application, the screenshot to the second user equipment.

4. The system of claim 1, wherein the one or more entities in the user interface are identified based on one or more bindings between the one or more entities and one or more user interface elements being presented at the user interface.

5. The system of claim 1 further comprising:
associating the screenshot with the identified one or more entities and metadata to enable access to the target application for accessing the one or more entities, wherein the metadata includes a uniform resource locator for navigating to the target application and parameters for accessing in the target application, the uniform resource locator stored, by the screen share service in the persistent store, in association with the identified one or more entities associated with and the screenshot.

6. The system of claim 1 further comprising:
presenting the screenshot within a second messaging user interface associated with the messaging application at the second user equipment, wherein the screenshot is invoked by selecting the screenshot being presented on a display of the second user equipment.

7. The system of claim 1 further comprising:
enabling, at the second user equipment, access to the identified one or more entities based on an authorization service check to confirm the second user is authorized to view, use, and/or access the one or more entities, wherein the providing is inhibited if the second user is not authorized.

8. A method comprising:
in response to receiving a request to capture a screenshot at a first user equipment, identifying, by a screen share service, one or more entities in a user interface being captured with the screenshot;
storing, by the screen share service in a persistent store, the identified one or more entities associated with the screenshot;
in response to invoking the screenshot at a messaging application at a second user equipment and the second user equipment not having access to a target application providing access to the one or more entities, obtaining, from the persistent store, the identified one or more entities to enable the second user equipment to present the identified one or more entities;
providing the identified one or more entities to the second user equipment; and
in response to invoking the screenshot at the messaging application at the second user equipment and the second user equipment having access to the target application providing access to the one or more entities, by-passing the persistent store to enable direct access of the one or more entities by the second user equipment.

9. The method of claim 8, wherein the entity comprises a data object and a method.

10. The method of claim 8 further comprising:
presenting the user interface at the first user equipment; and
presenting a first messaging user interface within the user interface at the first user equipment to enable sending, via at least the messaging application, the screenshot to the second user equipment.

11. The method of claim 8, wherein the one or more entities in the user interface are identified based on one or more bindings between the one or more entities and one or more user interface elements being presented at the user interface.

12. The method of claim 8 further comprising:
associating the screenshot with the identified one or more entities and metadata to enable access to the target application for accessing the one or more entities, wherein the metadata includes a uniform resource locator for navigating to the target application and parameters for accessing in the target application, the uniform resource locator stored, by the screen share service in the persistent store, in association with the identified one or more entities associated with and the screenshot.

13. The method of claim 8 further comprising:
presenting the screenshot within a second messaging user interface associated with the messaging application at the second user equipment, wherein the screenshot is invoked by selecting the screenshot being presented on a display of the second user equipment.

14. The method of claim 8 further comprising:
enabling, at the second user equipment, access to the identified one or more entities based on an authorization service check to confirm the second user is authorized to view, use, and/or access the one or more entities, wherein the providing is inhibited if the second user is not authorized.

15. A non-transitory computer-readable storage medium including instructions which, when executed by at least one data processor, result in operations comprising:
in response to receiving a request to capture a screenshot at a first user equipment, identifying, by a screen share service, one or more entities in a user interface being captured with the screenshot;
storing, by the screen share service in a persistent store, the identified one or more entities associated with the screenshot;
in response to invoking the screenshot at a messaging application at a second user equipment and the second user equipment not having access to a target application providing access to the one or more entities, obtaining, from the persistent store, the identified one or more entities to enable the second user equipment to present the identified one or more entities;
providing the identified one or more entities to the second user equipment; and
in response to invoking the screenshot at the messaging application at the second user equipment and the second user equipment having access to the target application providing access to the one or more entities, by-passing the persistent store to enable direct access of the one or more entities by the second user equipment.

16. The non-transitory computer-readable storage medium of claim 15, wherein the entity comprises a data object and a method.

17. The non-transitory computer-readable storage medium of claim 15 further comprising:
presenting the user interface at the first user equipment; and
presenting a first messaging user interface within the user interface at the first user equipment to enable sending, via at least the messaging application, the screenshot to the second user equipment.

18. The non-transitory computer-readable storage medium of claim 15, wherein the one or more entities in the user interface are identified based on one or more bindings between the one or more entities and one or more user interface elements being presented at the user interface.

19. The non-transitory computer-readable storage medium of claim 15 further comprising:
associating the screenshot with the identified one or more entities and metadata to enable access to the target application for accessing the one or more entities, wherein the metadata includes a uniform resource locator for navigating to the target application and parameters for accessing in the target application, the uniform resource locator stored, by the screen share service in the persistent store, in association with the identified one or more entities associated with and the screenshot.

\* \* \* \* \*